(12) United States Patent
Tomonari et al.

(10) Patent No.: US 10,074,904 B2
(45) Date of Patent: Sep. 11, 2018

(54) ANTENNA DEVICE AND COIL COMPONENT USED THEREIN

(71) Applicant: TDK Corporation, Tokyo (JP)

(72) Inventors: Toshio Tomonari, Tokyo (JP); Toshifumi Komachi, Tokyo (JP); Hirohumi Asou, Tokyo (JP)

(73) Assignee: TDK CORPORATION, Tokyo (JP)

( * ) Notice: Subject to any disclaimer, the term of this patent is extended or adjusted under 35 U.S.C. 154(b) by 95 days.

(21) Appl. No.: 15/181,688

(22) Filed: Jun. 14, 2016

(65) Prior Publication Data

US 2017/0025758 A1 Jan. 26, 2017

(30) Foreign Application Priority Data

Jun. 15, 2015 (JP) ................. 2015-120253

(51) Int. Cl.
*H01Q 7/00* (2006.01)
*H01Q 1/24* (2006.01)
*H04B 5/00* (2006.01)

(52) U.S. Cl.
CPC ............. *H01Q 7/00* (2013.01); *H01Q 1/243* (2013.01); *H04B 5/0062* (2013.01); *H04B 5/0081* (2013.01)

(58) Field of Classification Search
CPC ........... H01Q 1/243; H01Q 7/00; H01Q 7/06; H01Q 7/08; H04B 5/0062; H04B 5/0081
See application file for complete search history.

(56) References Cited

U.S. PATENT DOCUMENTS

| | | | |
|---|---|---|---|
| 2012/0262357 A1 | 10/2012 | Kato et al. | |
| 2013/0307746 A1* | 11/2013 | Nakano | H01Q 1/2225 343/850 |
| 2014/0203992 A1* | 7/2014 | Nakano | H01Q 7/00 343/867 |
| 2015/0236401 A1* | 8/2015 | Yamaguchi | H01Q 1/243 343/702 |

FOREIGN PATENT DOCUMENTS

| | | |
|---|---|---|
| JP | 2014-036437 | 2/2011 |
| JP | 2011103702 A | 5/2011 |

* cited by examiner

*Primary Examiner* — Robert Karacsony
(74) *Attorney, Agent, or Firm* — Young Law Firm, P.C.

(57) ABSTRACT

An antenna device is provided with first and second substrates opposed to each other, one or more first wiring patterns provided on the first substrate, one or more second wiring patterns provided on the second substrate, and a plurality of connection conductors each connecting an end portion of its corresponding first wiring pattern and an end portion of its corresponding second wiring pattern. The first wiring patterns, second wiring patterns and the plurality of connection conductors constitute an antenna coil.

18 Claims, 6 Drawing Sheets

ANTENNA DEVICE AND COIL COMPONENT USED THEREIN

BACKGROUND OF THE INVENTION

Field of the Invention

The present invention relates to an antenna device and, more particularly, to an antenna device suitable for NFC (Near Field Communication). The present invention further relates to a coil component used in such an antenna device.

Description of Related Art

In recent years, a mobile wireless device such as a smartphone is equipped with an RFID (Radio Frequency Identification: individual identification by radio waves) system, and further equipped with, as a communication means of the RFID, an antenna for performing the near field communication with a reader/writer and the like.

Further, such a mobile wireless device is provided with a metal shield in order to protect a built-in circuit from external noise and prevent unnecessary radiation of noise generated inside the device. In particular, recently, in view of thinning, light-weighting, durability against impacts such as drops, designability, and the like, a housing itself of the mobile wireless device is often made of a metal instead of a resin and serves also as the metal shield. However, the metal shield blocks radio waves in general, so that when an antenna needs to be provided, it needs to be disposed at a position not covered with the metal shield. Thus, when the metal shield covers a wide range, it is difficult to dispose the antenna.

To solve the above problem, an antenna device described in, e.g., Japanese Patent No. 4,941,600 is an NFC antenna suitable for an RFID system and includes a loop or spiral coil conductor, a conductor layer having an aperture and a slit continuous with the aperture, and a magnetic sheet disposed at a position further than the coil conductor from the conductor layer, wherein an opening of the coil conductor overlaps with the aperture of the conductor layer in a plan view. In this antenna device, current flows in the conductor layer so as to block a magnetic field generated by the flowing of the current in the coil conductor. Then, the current flowing around the aperture of the conductor layer passes around a slit, with the result that the current also flows around the conductor layer by an edge effect. Thus, a magnetic field is generated also from the conductor layer, and the conductor layer enlarges a magnetic flux loop, whereby a communication distance between the antenna device and a counterpart antenna can be extended.

Although the above conventional antenna device described in Japanese Patent No. 4,941,600 is so-called a planar coil antenna, there is known a three-dimensional solenoid antenna. An antenna of this type is easily increased in inductance than the planar coil antenna, can generate more magnetic lines, and is easily reduced in size. For example, an antenna device described in Japanese patent application Laid-Open No. 2014-36437 has a configuration in which a magnetic core is sandwiched between patterns formed on respective flexible substrates, and the patterns are connected by soldering.

In a case where the housing itself of the mobile wireless device serves also as the metal shield as described above, a consideration needs to be made to prevent an antenna from being affected by the metal shield even if the antenna is a solenoid antenna, and when the metal shield covers a wide range, it is difficult to dispose the antenna. Further, an aperture size of a known solenoid antenna wound around an outer peripheral surface of a winding core of a magnetic core or the like is restricted by a cross-sectional size of the magnetic core, making it difficult to increase the aperture size. Further, the solenoid antenna has too much directivity and, in addition, when a size of the antenna is reduced, it cannot generate a large magnetic flux loop that can cross a counterpart antenna, resulting in a short communication distance, which poses a practical problem for the solenoid antenna as a near field communication antenna.

SUMMARY

An object of the present invention is therefore to provide an antenna device suitable for near field communication in which a solenoid antenna coil having as large an aperture as possible can be installed within a limited space like an inside of a housing of the mobile wireless device and a coil component suitable for constituting such an antenna device.

To solve the above problems, an antenna device according to the present invention includes: first and second substrates opposed to each other; one or more first wiring patterns provided on the first substrate; one or more second wiring patterns provided on the second substrate; and a plurality of connection conductors each connecting an end portion of an associated one of the first wiring patterns to an end portion of an associated one of the second wiring patterns. An antenna coil is constituted by the first wiring patterns, second wiring patterns, and the plurality of connection conductors.

According to the present invention, an antenna coil having as large an aperture as possible can be easily formed in a limited space like an inside of a housing of a mobile wireless device, whereby inductance of the antenna coil can be enhanced. Therefore, a communication distance of the antenna can be extended, whereby an antenna device suitable for near field communication can be provided. Further, in the present invention, the design of the antenna device is an expansion of design of the circuit on the first substrate, so that it is possible to easily design and implement the antenna device without the need of preparing discrete coil components.

In the present invention, the first wiring patterns are preferably formed on one main surface of the first substrate, and the second wiring patterns are preferably formed on one main surface of the second substrate opposite to the one main surface of the first substrate. With this configuration, the first and second wiring patterns can be easily connected to each other through the connection conductors.

In the present invention, the plurality of connection conductors are each preferably a spring pin connector vertically installed on the first substrate. With this configuration, the first and second wiring patterns can be easily and reliably connected using the connection conductors and, thus, desired connection reliability and desired electrical characteristics can be ensured.

In the present invention, the first substrate is preferably a printed circuit board, and the second substrate is preferably a flexible substrate. Using the printed circuit board as the first substrate allows the spring connector to be reliably fixed thereto. Further, a main circuit board of a mobile wireless device may also be used as the first substrate. In this case, the antenna coil can efficiently be implemented in the mobile wireless device. Further, using the flexible substrate as the second substrate facilitates bonding thereof to a back surface of the mobile wireless device, allowing the antenna coil to be implemented further efficiently.

The antenna device preferably further includes a magnetic core provided in a hollow portion of the antenna coil. In this case, the magnetic core is preferably a magnetic sheet supported by the first or second substrate. With this configuration, inductance of the antenna coil can be further enhanced, whereby a communication distance of the antenna can be further extended.

In the present invention, it is preferable that the antenna coil is provided inside the housing of the mobile wireless device, that the housing has a metal cover layer substantially parallel to a coil axis of the antenna coil, and that the antenna coil is disposed near an edge of the metal cover layer. When the housing of the mobile wireless device has the metal cover layer, durability or designability of the mobile wireless device can be improved, while the antenna device may fail to perform communication due to a shielding effect of the metal cover layer. However, according to the present invention, it is possible to perform wireless communication using the antenna coil while suppressing influence of the metal cover layer as much as possible, thereby making it possible to lay out the antenna coil efficiently within a limited space inside the housing of the mobile wireless device while ensuring satisfactory antenna characteristics.

In the present invention, the antenna coil is preferably covered with the metal cover layer without protruding from the edge of the metal cover layer. For example, when the entire back surface of the housing of the mobile wireless device is covered with the metal cover layer, durability and designability of the mobile wireless device can be further improved; in this case, however, it is impossible to provide the antenna coil at a position not covered with the metal cover layer. Even in such a case, the antenna device according to the present invention can achieve wireless communication using the antenna coil while suppressing influence of the metal cover layer as much as possible.

In the present invention, the flexible substrate is preferably fixed to the metal cover layer. With this configuration, it is possible to form an antenna coil having as large an aperture as possible while reliably supporting the flexible substrate.

A coil component according to the present invention includes: first and second substrates opposed to each other; one or more first wiring patterns provided on the first substrate; one or more second wiring patterns provided on the second substrate; and a plurality of connection conductors each connecting an end portion of an associated one of the first wiring patterns and an end portion of an associated one of the second wiring patterns. A coil element is constituted by the first wiring patterns, second wiring patterns, and the plurality of connection conductors.

According to the present invention, a coil element having as large an aperture as possible within a limited space like, e.g., an inside of a housing of a mobile wireless device can be easily formed. Thus, the inductance of the coil component can be enhanced. Further, according to the present invention, the design of the antenna component is an expansion of design of the circuit on the first substrate, so that it is possible to easily design and implement the coil component without the need of preparing discrete coil components.

Further, a mobile wireless device according to the present invention includes an antenna device having the above-described features, wherein the first substrate is a main circuit board of the mobile wireless device. According to the present invention, the design of the antenna device is an expansion of design of the circuit on the first substrate, so that it is possible to easily design and implement the antenna device without the need of preparing discrete coil components.

According to the present invention, there can be provided an antenna device suitable for near field communication in which a solenoid antenna coil having as large an aperture as possible can be installed within a limited space like an inside of a housing of the mobile wireless device and a coil component suitable for constituting such an antenna device.

BRIEF DESCRIPTION OF THE DRAWINGS

The above features and advantages of the present invention will be more apparent from the following description of certain preferred embodiments taken in conjunction with the accompanying drawings, in which:

FIG. 5A is a plan view of the lower coil conductor 11, and FIG. 5B is a plan view of the upper coil conductor 13 as viewed transparently through the flexible substrate 12.

DETAILED DESCRIPTION OF THE EMBODIMENTS

Preferred embodiments of the present invention will be explained below in detail with reference to the accompanying drawings.

Figure 1:
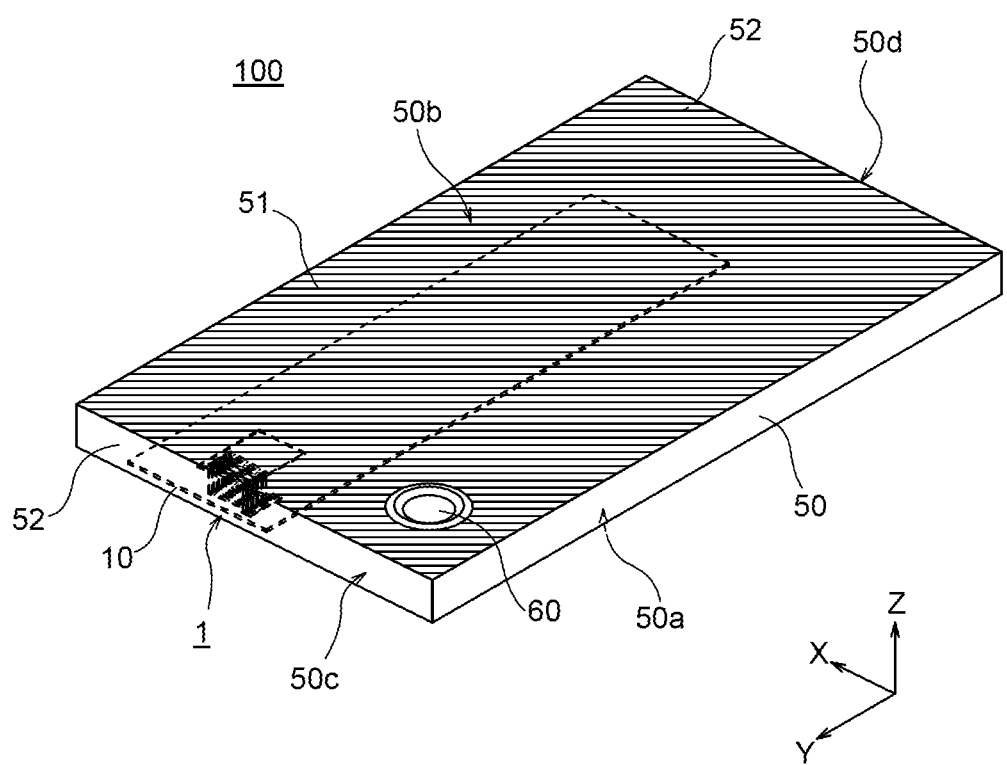
FIG. 1 is a perspective view schematically illustrating a configuration of a mobile wireless device including an antenna device according to an embodiment of the present invention.

FIG. 1 is a perspective view schematically illustrating a configuration of a mobile wireless device including an antenna device according to an embodiment of the present invention.

As illustrated in FIG. 1, a mobile wireless device 100 according to the present embodiment is, e.g., a smartphone and has a very thin housing 50. In FIG. 1, a back surface 50b of the housing 50 faces upward, and a front surface 50a of the housing 50 on which a display is mainly provided faces downward. The housing 50 is made of a combination of a resin and a metal, and substantially the entire surface of the back surface 50b of the housing 50 is formed as a metal cover layer 51. One end surface (upper end surface 50c) and the other end surface (lower end surface 50d) in a longitudinal direction (Y-direction), which are perpendicular to the back surface 50b of the housing 50, are formed as a resin cover layer 52 which is a non-shielded area where the metal cover layer 51 is not provided. The metal cover layer 51 is provided for improving mechanical strength, magnetic shielding characteristics, and designability of the housing. An aperture for exposing a camera 60 may be formed in a part of a formation area of the metal cover layer 51.

The mobile wireless device 100 incorporates an antenna device 1. The antenna device 1 is disposed near the upper end surface 50c of the housing 50. The antenna device 1 according to the present embodiment is, e.g., an NFC antenna having a resonant frequency of 13.56 MHz and mounted on a printed circuit board 10. The printed circuit board 10 is preferably a main circuit board (control logic board) of the mobile wireless device 100.

Figure 2:
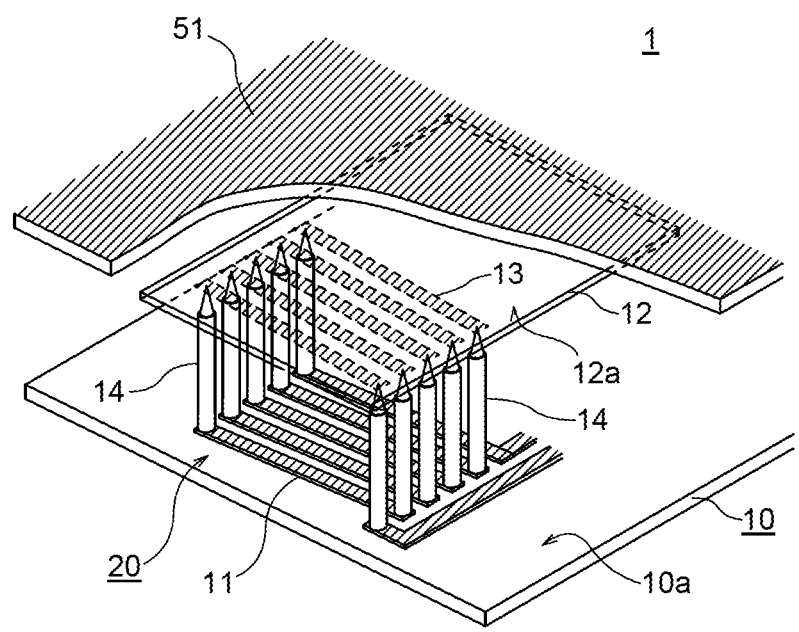
FIG. 2 is a schematic perspective view illustrating, in an enlarged manner, a configuration of the antenna device according to the present embodiment.
Figure 2:
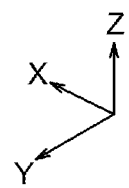
Figure 3:
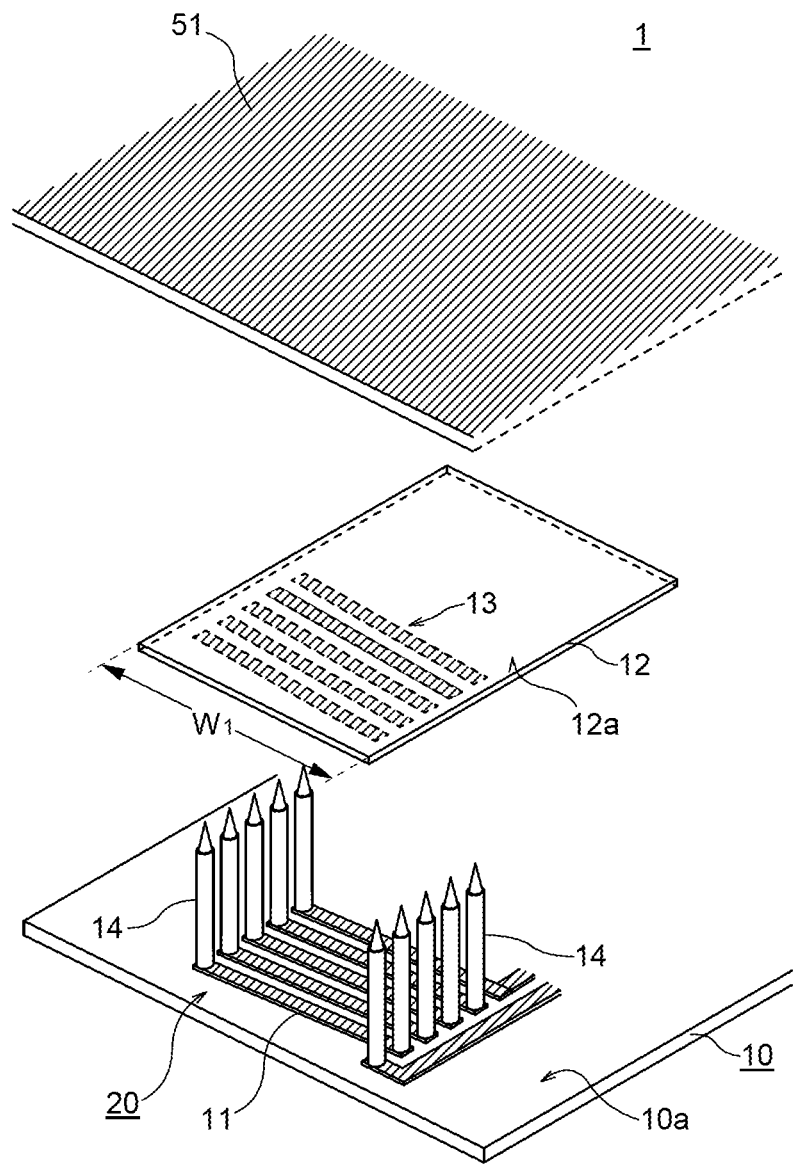
FIG. 3 is an exploded perspective view of the antenna device illustrated in FIG. 2.

FIG. 2 is a schematic perspective view illustrating, in an enlarged manner, a configuration of the antenna device 1 according to the present embodiment. FIG. 3 is an exploded perspective view of the antenna device 1 illustrated in FIG. 2.

As illustrated in FIGS. 2 and 3, the antenna device 1 has a printed circuit board 10 (first substrate), a lower coil conductor 11 formed on one main surface 10a of the printed circuit board 10, a flexible substrate 12 (second substrate) provided above the printed circuit board 10, an upper coil conductor 13 formed on one main surface 12a of the flexible substrate 12 that is opposite to the one main surface 10a of the printed circuit board 10, and a plurality of spring pin connectors 14 for connecting the lower coil conductor 11 and the upper coil conductor 13. The side above the printed circuit board 10, at which the flexible substrate 12 is disposed, refers to a side that the one main surface 10a of the printed circuit board 10 on which the upper coil conductor 13 is formed faces.

The lower coil conductor 11 includes a plurality of lower wiring patterns (first wiring patterns) arranged in parallel, and similarly, the upper coil conductor 13 includes a plurality of upper wiring patterns (second wiring patterns) arranged in parallel. That is, the lower coil conductor 11 and upper coil conductor 13 each have a line-and-space pattern having a fixed line width and pitch. The plurality of lower wiring patterns and the plurality of upper wiring patterns are alternately and sequentially connected to each other through the spring pin connectors 14, thereby forming a solenoid or a helical antenna coil 20 (coil element). The number of the lower wiring patterns may be the same as or larger by one than the number of the upper wiring patterns. The number of turns of the antenna coil 20 is not especially limited but can be set depending on the antenna characteristics.

The lower coil conductor 11 and the upper coil conductor 13 are each preferably formed in a range as wide as possible in the X-direction. With this configuration, an aperture size of the antenna coil 20 can be made as large as possible, allowing the inductance of the antenna coil 20 to be enhanced. Further, by forming the lower coil conductor 11 and the upper coil conductor 13 in a range as wide as possible in the Y-direction, the number of the lower wiring patterns can be increased and, in turn, the number of turns of the antenna coil 20 can be increased. Thus, the inductance of the antenna coil 20 can be enhanced.

Each of the spring pin connectors 14 is vertically installed on the printed circuit board 10, and a base end portion thereof is mechanically fixed onto the printed circuit board 10 by soldering and connected to an end portion of each of the lower wiring patterns. A leading end portion of each spring pin connector 14 has a spring property and contacts an end portion of each of the upper wiring patterns under a moderate pressure. With this configuration, one lower wiring pattern is electrically connected to one upper wiring pattern.

As illustrated in FIG. 3, the printed circuit board 10 is a rigid substrate typified by a glass epoxy substrate. The flexible substrate 12 is a substrate formed using a thin and flexible insulating base material. The flexible substrate 12 is made of, e.g., a PET resin and has a thickness of, e.g., 30 μm. A planar size of the flexible substrate 12 is set according to a size of the upper coil conductor 13.

An upper side of the flexible substrate 12 is covered with the metal cover layer 51 constituting a housing wall of the mobile wireless device 100. For descriptive convenience, a part of the metal cover layer 51 is broken in FIG. 2. In a state where the antenna device 1 is properly set in the housing 50, the flexible substrate 12 is brought into tight contact with a back surface of the metal cover layer 51, allowing the leading end portions of the spring pin connectors 14 to be brought into pressure contact with a surface of the upper coil conductor 13. The flexible substrate 12 is preferably fixed to the back surface of the metal cover layer 51 by an adhesive.

Figure 4A:
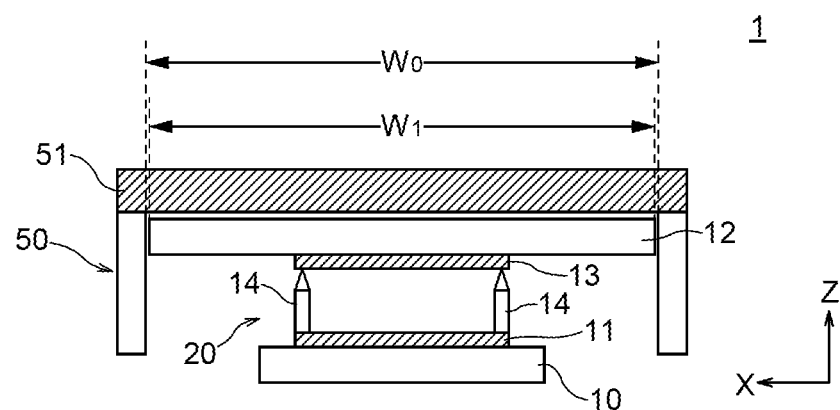
FIGS. 4A and 4B are side cross-sectional views of the antenna device parallel to a XZ plane for explaining examples of the size of the flexible substrate.
Figure 4B:
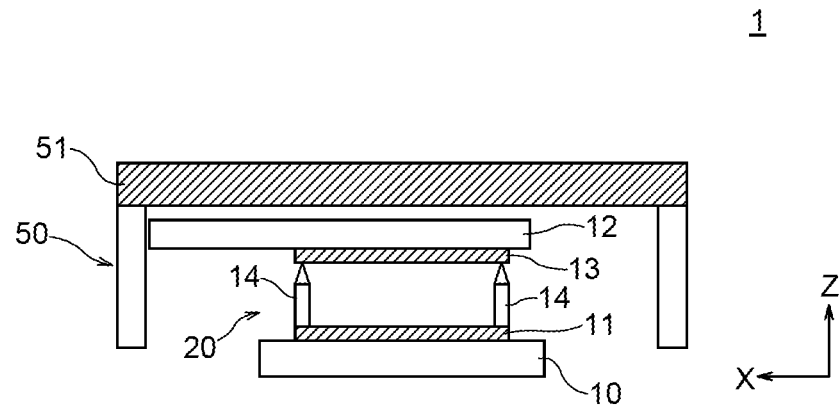

The planar size of the flexible substrate 12 may be arbitrarily set as long as it can cover the entire formation area of the upper coil conductor 13. That is, the planar size of the flexible substrate 12 may be made large irrespective of a planar size of the upper coil conductor 13. Further, the planar size of the flexible substrate 12 may be set irrespective of a planar size of the printed circuit board 10. Thus, for example, as illustrated in FIG. 4A, an X-direction width $W_1$ of the flexible substrate 12 may be set equivalent to an X-direction inner width $W_0$ of the housing 50. In such a case, simply by setting the flexible substrate 12 inside the housing 50, an X-direction position of the upper coil conductor 13 can be properly set in the housing 50 with ease. Alternatively, as illustrated in FIG. 4B, only an X-direction one side (right or left side) of the flexible substrate 12 is made longer than the printed circuit board 10 to be flush with an inner surface of the housing 50 at an X-direction one side thereof. Also in this case, simply by placing the flexible substrate 12 near the X-direction one side of the housing 50 and fixing it, the X-direction position of the upper coil conductor 13 can be properly set.

Figure 5A:
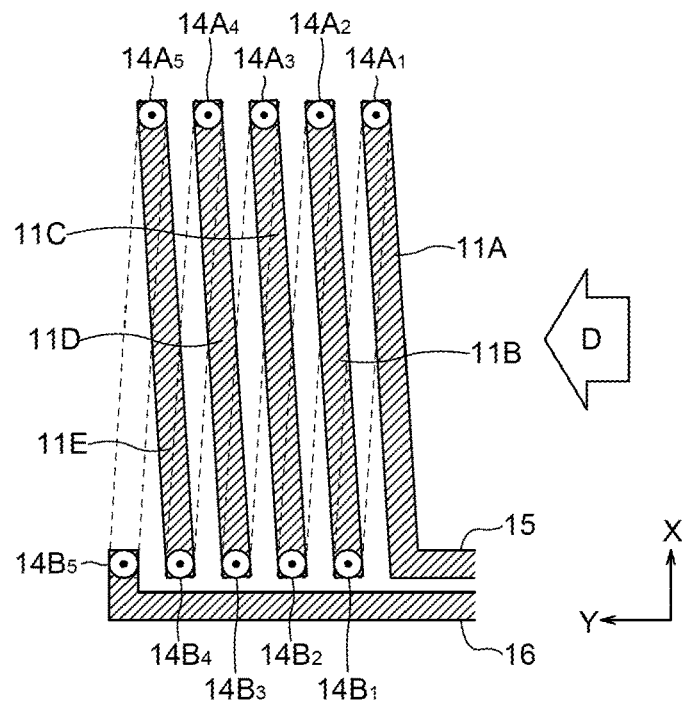
FIGS. 5A and 5B are planar layouts of the respective lower coil conductor 11 and upper coil conductor 13 constituting the antenna coil 20, and particularly.
Figure 5B:
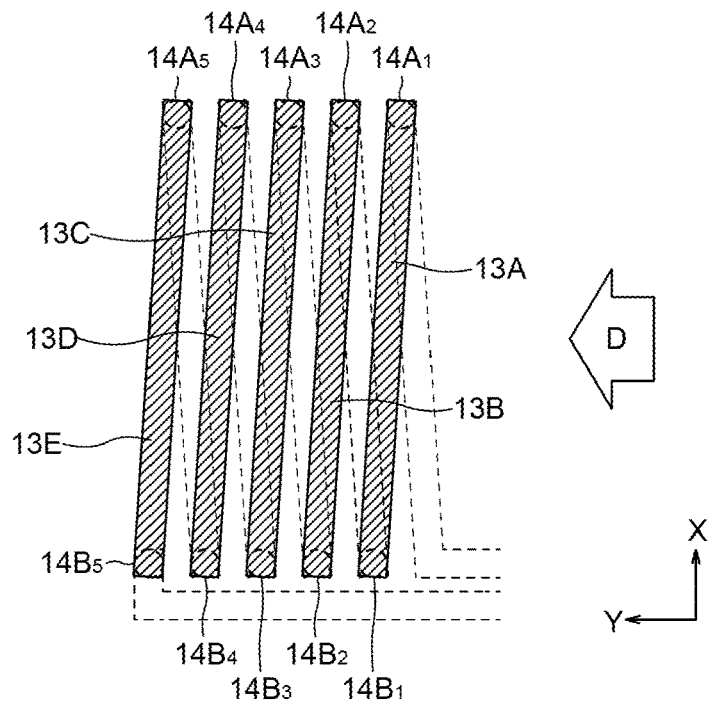

FIGS. 5A and 5B are planar layouts of the respective lower coil conductor 11 and upper coil conductor 13 constituting the antenna coil 20. FIG. 5A is a plan view of the lower coil conductor 11, and FIG. 5B is a plan view of the upper coil conductor 13 as viewed transparently through the flexible substrate 12.

As illustrated in FIG. 5A, the lower coil conductor 11 on the printed circuit board 10 includes five lower wiring patterns 11A to 11E. The five lower wiring patterns 11A to 11E are each a linear pattern extending in the X-direction while being slightly inclined to an upper-left side. One ends and the other ends of the lower wiring patterns 11A to 11E are aligned in the Y-direction. Except for one end of the first lower wiring pattern 11A, the spring pin connector 14 is connected to end portions of the respective lower wiring patterns 11A to 11E.

As illustrated in FIG. 5B, the upper coil conductor 13 on the flexible substrate 12 includes five upper wiring patterns 13A to 13E. The five upper wiring patterns 13A to 13E are each a linear pattern extending in the X-direction while being slightly inclined to an upper-right side. As described above, by inclining the lower wiring patterns and the upper wiring patterns mutually in the opposite directions, one end of one of the two adjacent lower wiring patterns overlaps with one end of the upper wiring pattern in a plan view, and the other end of the other one of the two adjacent lower wiring patterns overlaps with the other end of the upper wiring pattern in a plan view. Thus, the end portions of the upper wiring patterns and those of the lower wiring patterns can be easily connected to each other by using the spring pin connectors 14. The following describes in detail a structure of the antenna coil 20.

One end of the first lower wiring pattern 11A is connected seamlessly to one end of a first lead pattern 15, and the other end thereof is connected to the spring pin connector $14A_1$. One end of the first upper wiring pattern 13A is connected to the other end of the first lower wiring pattern 11A through the spring pin connector $14A_1$, and the other end thereof is connected to one end of the second lower wiring pattern 11B through the spring pin connector $14B_1$. Thus, the first lower wiring pattern 11A, the spring pin connector $14A_1$, the first upper wiring pattern 13A, and the spring pin connector $14B_1$ are connected in series in this order, thereby forming a first turn of the antenna coil 20.

A second turn of the antenna coil 20 includes the second lower wiring pattern 11B, the spring pin connector $14A_2$, the second upper wiring pattern 13B, and the spring pin connector $14B_2$ which are connected in series in this order. That is, one end of the second upper wiring pattern 13B is connected to the other end of the second lower wiring pattern 11B through the spring pin connector $14A_2$, and the other end thereof is connected to one end of the third lower wiring pattern 11C through the spring pin connector $14B_2$.

A third turn of the antenna coil 20 includes the third lower wiring pattern 11C, the spring pin connector $14A_3$, the third upper wiring pattern 13C, and the spring pin connector $14B_3$ which are connected in series in this order. That is, one end of the third upper wiring pattern 13C is connected to the other end of the third lower wiring pattern 11C through the spring pin connector $14A_3$, and the other end thereof is connected to one end of the fourth lower wiring pattern 11D through the spring pin connector $14B_3$.

A fourth turn of the antenna coil 20 includes the fourth lower wiring pattern 11D, the spring pin connector $14A_4$, the fourth upper wiring pattern 13D, and the spring pin connector $14B_4$ which are connected in series in this order. That is, one end of the fourth upper wiring pattern 13D is connected to the other end of the fourth lower wiring pattern 11D through the spring pin connector $14A_4$, and the other end thereof is connected to one end of the fifth lower wiring pattern 11E through the spring pin connector $14B_4$.

A fifth turn of the antenna coil 20 includes the fifth lower wiring pattern 11E, the spring pin connector $14A_5$, the fifth upper wiring pattern 13E, and the spring pin connector $14B_5$ which are connected in series in this order. That is, one end of the fifth upper wiring pattern 13E is connected to the other end of the fifth lower wiring pattern 11E through the spring pin connector $14A_5$, and the other end thereof is connected to one end of a second lead pattern 16 through the spring pin connector $14B_5$.

Both ends of the antenna coil 20, that is, the other end of the first lead pattern 15 and the other end of the second lead pattern 16 are connected to, e.g., an NFC chip. The NFC chip is a semiconductor IC chip including a modulation/demodulation circuit for near field communication. A method of extracting the both ends of the antenna coil 20 is not especially limited. For example, the both ends or one end may be extracted to the other main surface side of the printed circuit board 10 through a through hole conductor formed in the printed circuit board 10.

The above configuration can be generalized as follows. That is, in the antenna coil 20 in which the total number of turns is n, the other end of an i-th (i is a positive integer equal to or less than n) lower wiring pattern overlaps with one end of an i-th upper wiring pattern in a plan view and is connected to one end of the i-th upper wiring pattern through the spring pin connector 14 vertically installed at a position corresponding to the other end of the lower wiring pattern. Further, the other end of the upper wiring pattern overlaps with one end of an (i+1)-th lower wiring pattern in a plan view and is connected to the other end of the i-th upper wiring pattern through the spring pin connector 14 vertically installed at a position corresponding to one end of the (i+1)-th lower wiring pattern. In this manner, an i-th turn of the antenna coil 20 is formed. By repeating this configuration from the first turn to the n-th turn, the antenna coil having n turns can be obtained.

When a current directed from the first lead pattern 15 to the second lead pattern 16 flows in the antenna coil 20, this current circulates in a counterclockwise direction when viewed in a direction of an arrow D, and a direction of a magnetic flux $\phi$ (see FIG. 6) that crosses the antenna coil 20 is opposite to the direction of the arrow D. On the other hand, when a current directed from the second lead pattern 16 to the first lead pattern 15 flows in the antenna coil 20, this current circulates in a clockwise direction when viewed in the direction of the arrow D, and a direction of the magnetic flux $\phi$ that crosses the antenna coil 20 coincides with the direction of the arrow D.

Figure 6:
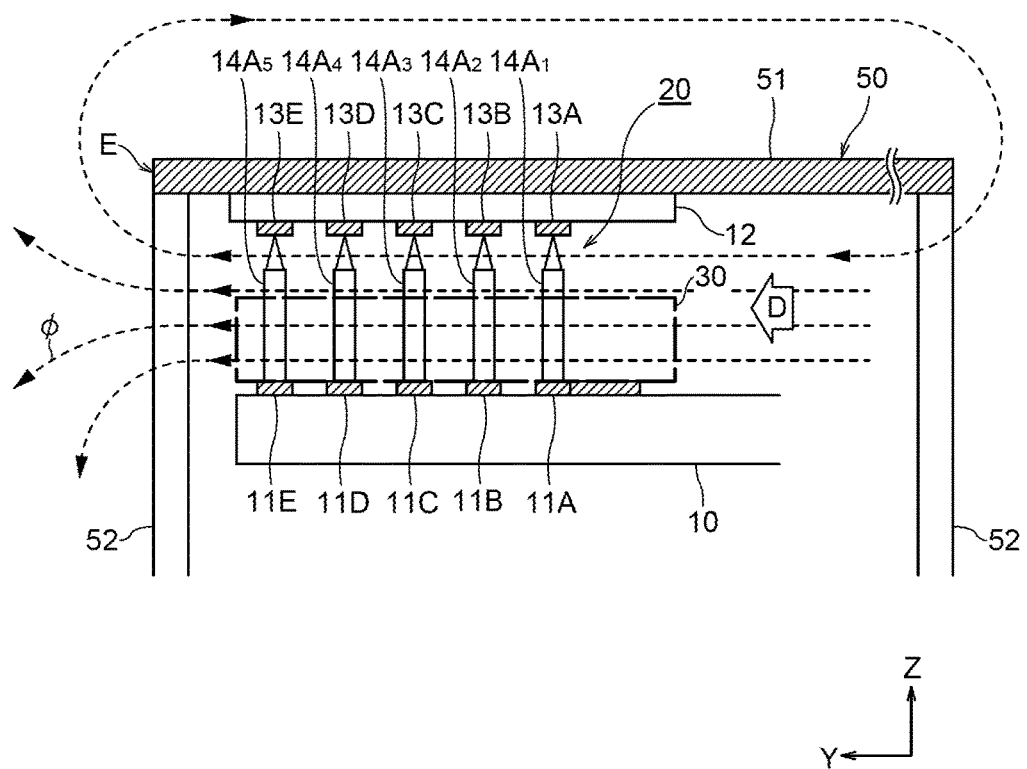
FIG. 6 is a side cross-sectional view of the antenna device parallel to a YZ plane.

FIG. 6 is a side cross-sectional view of the antenna device 1 parallel to a YZ plane.

As illustrated in FIG. 6, the antenna coil 20 constituting the antenna device 1 is provided inside the housing 50 of the mobile wireless device 100, and an upper side of the antenna coil 20 is covered with the metal cover layer 51. In the present embodiment, the flexible substrate 12 is bonded and fixed to the back surface of the metal cover layer 51.

The metal cover layer 51 is a planar conductor constituting the back surface of the housing 50. The metal cover layer 51 is provided substantially parallel to the printed circuit board 10 and the flexible substrate 12 and covers the antenna coil from above. The antenna coil 20 is disposed at one end side of the housing 50 in the Y-direction and near an edge E of the metal cover layer 51. The edge E of the metal cover layer 51 is a linear edge extending in the X-direction. The antenna coil 20 overlaps with the metal cover layer 51 in a plan view. The antenna coil 20 does not protrude from the edge E of the metal cover layer 51, and the entire area thereof is covered with the metal cover layer 51.

A coil axis of the antenna coil 20 is directed in the Y-direction and substantially parallel to the metal cover layer 51. One end side of the antenna coil 20 in the coil axis direction (Y-direction) is also covered with the housing wall of the mobile wireless device 100; however, the housing wall at this part is the resin cover layer 52, so that a magnetic flux emitted from one end or the other end of the antenna coil 20 can be radiated outside the mobile wireless device 100. Further, the magnetic flux emitted from the antenna coil 20 circulates outside the metal cover layer 51 and returns to the antenna coil 20. As a result, a large magnetic flux loop is formed to allow a communication distance to be extended.

A magnetic core 30 may be provided in a hollow portion inside the antenna coil 20 as denoted by a dashed line. The magnetic core 30 may be a thin type that occupies only a lower space at the printed circuit board 10 side as illustrated, or may be a thin type that occupies only an upper space at the flexible substrate 12 side. Also, when the magnetic core 30 as described above is provided, the inductance of the antenna coil 20 can be enhanced to make it possible to improve antenna characteristics.

In the present embodiment, the magnetic core 30 is preferably a composite magnetic sheet obtained by combining a magnetic metal powder having a flat form with a large aspect ratio with a polymer. Particles of the flat metal powder overlap with each other in a thickness direction of the composite magnetic sheet, and a surface direction of the flat metal powder is oriented parallel to a surface direction of the composite magnetic sheet, whereby effective permeability in the surface direction of the composite magnetic sheet can be enhanced. This allows a magnetic field generated by the antenna coil 20 to be pulled inside the magnetic sheet from outside and to be guided along the coil axis direction. Further, although the flat magnetic powder is densely arranged in the polymer, particles of the flat magnetic powder are insulated by the polymer from each other, making it possible to prevent occurrence of an eddy current. Thus, it is possible to realize both a high permeability and a low magnetic loss in a use frequency band (e.g., 13.56 MHz) of the antenna coil 20.

As described above, in the antenna device 1 according to the present embodiment, end portions of the upper and lower wiring patterns are alternately connected by the spring pin connectors 14 to form the helical antenna coil 20, so that it is possible to easily form an antenna coil having as large an aperture as possible in a limited space inside the housing 50 of the mobile wireless device 100. For example, in a known solenoid antenna coil wound around an outer peripheral surface of a winding core of a magnetic core, a cross-sectional size of the winding core shows the aperture size of the antenna coil as it is, thus making it impossible to form an antenna coil having an aperture with a size larger than the cross-sectional size of the winding core. However, in the present embodiment, the winding core is not essential for forming the antenna coil and, therefore, the aperture size is not restricted by the cross-sectional size of the magnetic core, thereby making it possible to easily form a solenoid antenna coil having an aperture larger than the cross-sectional size of the magnetic core. As a result, the inductance of the antenna coil 20 can be enhanced.

Further, in the present embodiment, the antenna coil 20 having the configuration as described above is disposed near the edge of the metal cover layer 51 such that the coil axis thereof is parallel to the metal cover layer 51, whereby influence of the metal cover layer 51 can be suppressed, allowing desired antenna characteristics to be obtained. Therefore, a communication distance of the antenna can be extended, whereby an antenna device suitable for near field communication can be provided. Further, in the present embodiment, the design of the antenna device 1 is an expansion of design of the circuit on the printed circuit board 10, so that it is possible to easily design and implement the antenna device without the need of preparing discrete coil components.

It is apparent that the present invention is not limited to the above embodiments, but may be modified and changed without departing from the scope and spirit of the invention.

For example, in the above embodiment, the spring pin connector 14 is used as a connection conductor for connecting the plurality of lower wiring patterns 11A to 11E and plurality of upper wiring patterns 13A to 13E; however, the present invention is not limited to this, and, for example, a connector structure obtained by combining a pin header and a pin socket may be adopted. It should be noted, however, that the spring pin connector 14 is very effective as a means for achieving a simple and reliable connection structure.

Further, in the above embodiments, the flexible substrate 12 is used as a supporting substrate (second substrate) for the upper coil conductor 13. However, a rigid substrate may also be used. It should be noted, however, that the flexible substrate 12 is effective due to its very thin shape and easiness of fitting to the back surface of the housing 50.

Further, in the above embodiment, a smartphone is taken as an example of the mobile wireless device 100 in which the antenna device 1 is incorporated; however, a type of the mobile wireless device is not especially limited, but a tablet terminal, a note-type PC, a wrist-watch-type wearable terminal, or the like may be taken as an example of the mobile wireless device 100.

The antenna coil 20 according to the present embodiment is used as an antenna, but may be used for other purposes. That is, the antenna coil 20 according to the present embodiment may be used as a common coil component.

What is claimed is:

1. An antenna device comprising:
   first and second substrates opposed to each other;
   one or more first wiring patterns provided on the first substrate;
   one or more second wiring patterns provided on the second substrate; and
   a plurality of connection conductors each connecting an end portion of an associated one of the first wiring patterns to an end portion of an associated one of the second wiring patterns,
   wherein each of the plurality of connection conductors includes a spring pin connector vertically installed on the first substrate, and
   wherein the first wiring patterns, second wiring patterns and the connection conductors constitute an antenna coil.

2. The antenna device as claimed in claim 1, wherein
   the first wiring patterns are formed on one main surface of the first substrate, and
   the second wiring patterns are formed on one main surface of the second substrate opposite to the one main surface of the first substrate.

3. The antenna device as claimed in claim 1, wherein
   the first substrate is a printed circuit board, and
   the second substrate is a flexible substrate.

4. The antenna device as claimed in claim 1 further comprising a magnetic core provided in a hollow portion of the antenna coil.

5. The antenna device as claimed in claim 4, wherein the magnetic core includes a magnetic sheet supported by the first or second substrate.

6. The antenna device as claimed in claim 1, wherein
   the antenna coil is provided inside a housing of a mobile wireless device,
   the housing has a metal cover layer substantially parallel to a coil axis of the antenna coil, and
   the antenna coil is disposed near an edge of the metal cover layer.

7. The antenna device as claimed in claim 6, wherein the antenna coil is covered with the metal cover layer without protruding from the edge of the metal cover layer.

8. The antenna device as claimed in claim 6, wherein a flexible substrate is fixed to the metal cover layer.

9. The antenna device as claimed in claim 1, wherein the antenna coil has a helical shaped.

10. A coil component comprising:
    first and second substrates opposed to each other;
    one or more first wiring patterns provided on the first substrate;
    one or more second wiring patterns provided on the second substrate; and
    a plurality of connection conductors each connecting an end portion of an associated one of the first wiring patterns to an end portion of an associated one of the second wiring patterns, wherein
    each of the plurality of connection conductors includes a spring pin connector vertically installed on the first substrate, and
    the first wiring patterns, second wiring patterns and the plurality of connection conductors constitute a coil element.

11. The coil component as claimed in claim 10, wherein
the coil element is provided inside a housing of a mobile wireless device,
the housing has a metal cover layer substantially parallel to a coil axis of the coil element, and
the coil element is disposed near an edge of the metal cover layer.

12. The coil component as claimed in claim 11, wherein the coil element is covered with the metal cover layer without protruding from the edge of the metal cover layer.

13. The coil component as claimed in claim 11, wherein a flexible substrate is fixed to the metal cover layer.

14. A coil component comprising:
a plurality of first wiring patterns formed on a first substrate, each of the first wiring patterns including a first end portion and a second end portion;
a plurality of second wiring patterns formed on a second substrate, each of the second wiring patterns including a third end portion vertically aligned with the first end portion of an associated one of the first wiring patterns and a fourth end portion vertically aligned with the second end portion of an associated another one of the first wiring patterns;
a plurality of first connection conductors connected between the first and third end portions that are vertically aligned; and
a plurality of second connection conductors connected between the second and fourth end portions that are vertically aligned,
wherein a diameter of the first and second connection conductors at the first and second end portions is different from a diameter of the first and second connection conductors at the third and fourth end portions.

15. The coil component as claimed in claim 14, wherein the first and second wiring patterns are covered with a metal cover layer.

16. The coil component as claimed in claim 15, wherein the first substrate, the second substrate, and the metal cover layer are substantially parallel to one another.

17. The coil component as claimed in claim 16, wherein one of the first and second substrates is attached to the metal cover layer.

18. The coil component as claimed in claim 17, wherein each of the first and second connection conductors includes a spring pin connector.

* * * * *